United States Patent [19]

Bingham et al.

[11] 4,101,833

[45] Jul. 18, 1978

[54] DUPLEX DATA TRANSMISSION MODEM UTILIZING AN INJECTED TONE FOR SHIFTING POWER WITHIN THE TRANSMIT SPECTRUM

[75] Inventors: John A. C. Bingham; Ronald K. Maxwell, both of Palo Alto, Calif.

[73] Assignee: The Vadic Corporation, Sunnyvale, Calif.

[21] Appl. No.: 775,104

[22] Filed: Mar. 7, 1977

[51] Int. Cl.$^2$ .............................................. H04L 27/00
[52] U.S. Cl. ........................................ 325/30; 325/52
[58] Field of Search ............ 179/2 DP, 2.5 R, 15 BF; 178/66 R, 67, 58; 325/2, 3, 52, 65, 67

[56] References Cited

U.S. PATENT DOCUMENTS

| | | | |
|---|---|---|---|
| 3,655,915 | 4/1972 | Liberman et al. | 178/58 R |
| 3,934,088 | 1/1976 | Marino | 179/2 DP |

Primary Examiner—Benedict V. Safourek
Attorney, Agent, or Firm—Lowhurst & Aine

[57] ABSTRACT

A full duplex communication system including a pair of full duplex modems. Each modem has both a call originate mode of operation and a call answer mode of operation. In the call originate mode outgoing data is transmitted by modulation of a carrier frequency F2 and incoming data is received by demodulation of a data modulating carrier of frequency F1. When in the answer mode of operation, the data is received on frequency F2 and transmitted on frequency F1. Means are provided for injecting a carrier frequency F6 in the outgoing data transmission path. The frequency F6 is near the midpoint between F1 and F2. The amplitude is such that the distribution of power within the transmission band is balanced so that the power in the frequency band set aside for single frequency signaling systems does not exceed the power in the remainder of the transmission band. This prevents the false operation of signal frequency systems triggered by the transmission of certain bit patterns, which could result in improper billing, intermittent transmission interruptions, insertion of a band elimination filter in the transmission path or the complete disconnection of a call.

5 Claims, 3 Drawing Figures

DUPLEX DATA TRANSMISSION MODEM UTILIZING AN INJECTED TONE FOR SHIFTING POWER WITHIN THE TRANSMIT SPECTRUM

RELATED APPLICATIONS

The present invention is an improvement of the apparatus described in U.S. Pat. No. 3,937,882 entitled "Full Duplex Communication System on a Two Wire Line" which issued to John A. C. Bingham on Feb. 10, 1976.

BACKGROUND OF THE INVENTION

The present invention relates to data transmission apparatus and more specifically to full duplex modems which provide for simultaneous two way transmission of data over a two wire telephone line.

DESCRIPTION OF THE PRIOR ART

In the prior art, such as the above-identified Bingham patent, a pair of full duplex modems are utilized, one at each end of the two wire telephone line. Each of the modems includes a transmitter for transmitting a stream of synchronous data on a first carrier frequency F1 or a second carrier frequency F2 depending upon whether the modem is in the answer mode or the call originate mode. The modem at the other end of the two wire circuit, when set in the answer mode, receives data transmitted at frequency F2 and transmits data at frequency F1. In practice, since the carrier is modulated, the transmitted power in the low band covers a bell-shaped curve over a spectrum centered about frequency F1, and in the high band the power spectrum is centered around frequency F2. (some modems transmit in the low band when in the originate mode, and in the high band when in the answer mode. Throughout the specification reference will be made to high-band and low-band, it being understood that either mode can be assigned thereto). In order to achieve the highest possible data transmission rates, the transmission apparatus utilizes the entire telephone circuit frequency band from a low frequency of 600 Hz to a high frequency of 2800 Hz. Distribution of power within the transmission band is limited by constraints placed thereon by the telephone company. These provide various criteria for out-of-band signal power generation to prevent interference with other carrier systems and to prevent cross talk between cable pairs which would cause interference with various wide band services using the same cables. Generally, the out-of-band criteria can be met by conventional techniques. However, distribution of power within the transmission band creates a different problem. In the U.S., the telephone company requires that power in the 2450 to 2750 Hz band (referred to as the "in-band power") not exceed the power in the 800 to 2400 Hz band in order to prevent interference with 2600 Hz single frequency signaling systems. These systems are used by the telephone company throughout its switched networks. False operation of single frequency systems can result in improper billing, intermittent transmission interruptions, insertion of a band elimination filter in the transmission path, or the complete disconnection of a call.

Some prior modems employ scramblers to distribute energy outside of the 2450 to 2750 Hz band. However, some transmitted data patterns will still produce more energy in the band than out of the band and therefore the prior art approach does not provide a complete and satisfactory solution.

A similar problem exists in countries outside the U.S. but the in-band frequencies specified are different.

SUMMARY OF THE PRESENT INVENTION

It is a principal object of the present invention to provide an improved full duplex communication system which includes means for distributing power within the transmission band in such a way as to eliminate interference with a particular frequency within the band regardless of data patterns transmitted.

The foregoing is accomplished in accordance with the invention by injecting a single-frequency tone in the outgoing data transmission path. The frequency is outside the power envelope and in accordance with one aspect of the invention the frequency is near the midpoint between the high and low carrier frequencies. The power level of the injected tone is such that the injected tone adds sufficient power outside the single-frequency band to ensure that the power in the signal frequency band does not exceed the power in the remainder of the transmission band for any transmittable data pattern.

In accordance with a further aspect of the invention, the injected frequency is chosen to be slightly above the midpoint frequency to accommodate for the differences in attenuation of received and transmitted signals.

The foregoing and other objects, features and advantages of the invention will be apparent from the following more particular description of a preferred embodiment of the invention as illustrated in the accompanying drawings.

DESCRIPTION

Figure 1:
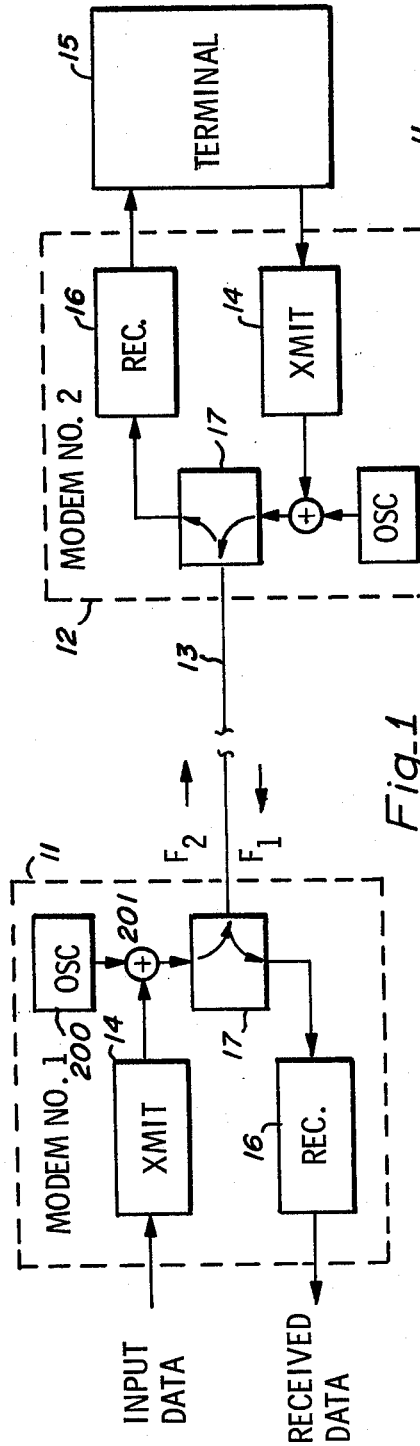
FIG. 1 is a schematic block diagram of a full duplex communication system for communication over two wire lines, which system incorporates the present invention.

Referring now to FIG. 1, there is shown a full duplex communication system for communication over a two wire standard voice grade telephone line of the type more fully described in the above-identified Bingham patent. A pair of modems (modulator-demodulators) 11 and 12 are connected to a two wire telephone line 13 which passes through a switching network. The modems 11 and 12 each include a transmitter 14 for the synchronous transmission of data on one of two carriers, F1 and F2. The originating modem 11 transmits in the high band F2 for example, at a carrier frequency of 2250 Hz and receives in the low band F1, for example, at a carrier frequency of 1150 Hz. The originating modem includes a receiver 16 for demodulating the low band data at a frequency F1 to provide a received data output. The answering modem 12 includes a receiver 16 which is set in the answer mode to receive and demodulate the upper band F2 carrier data which is transmitted to a terminal device 15. Hybrid couplers 17 are provided for coupling the transmitter and receiver in the respective modem to the two wire line 13.

In accordance with the present invention, an oscillator circuit 200 is provided for generating a single frequency tone, F6 at a frequency which is near the midpoint between F1 and F2. In the present example, the midpoint is 1700 Hz. However, as a practical matter, a frequency slightly higher than this is chosen in order to minimize the worst case - interference with both transmitted and received signals. Thus, a more practical frequency is 1743 Hz.

The injected frequency is added to the output of the transmitter 14 by an adder circuit 201 prior to the insertion of the summed signal to the hybrid network 17.

Figure 2:
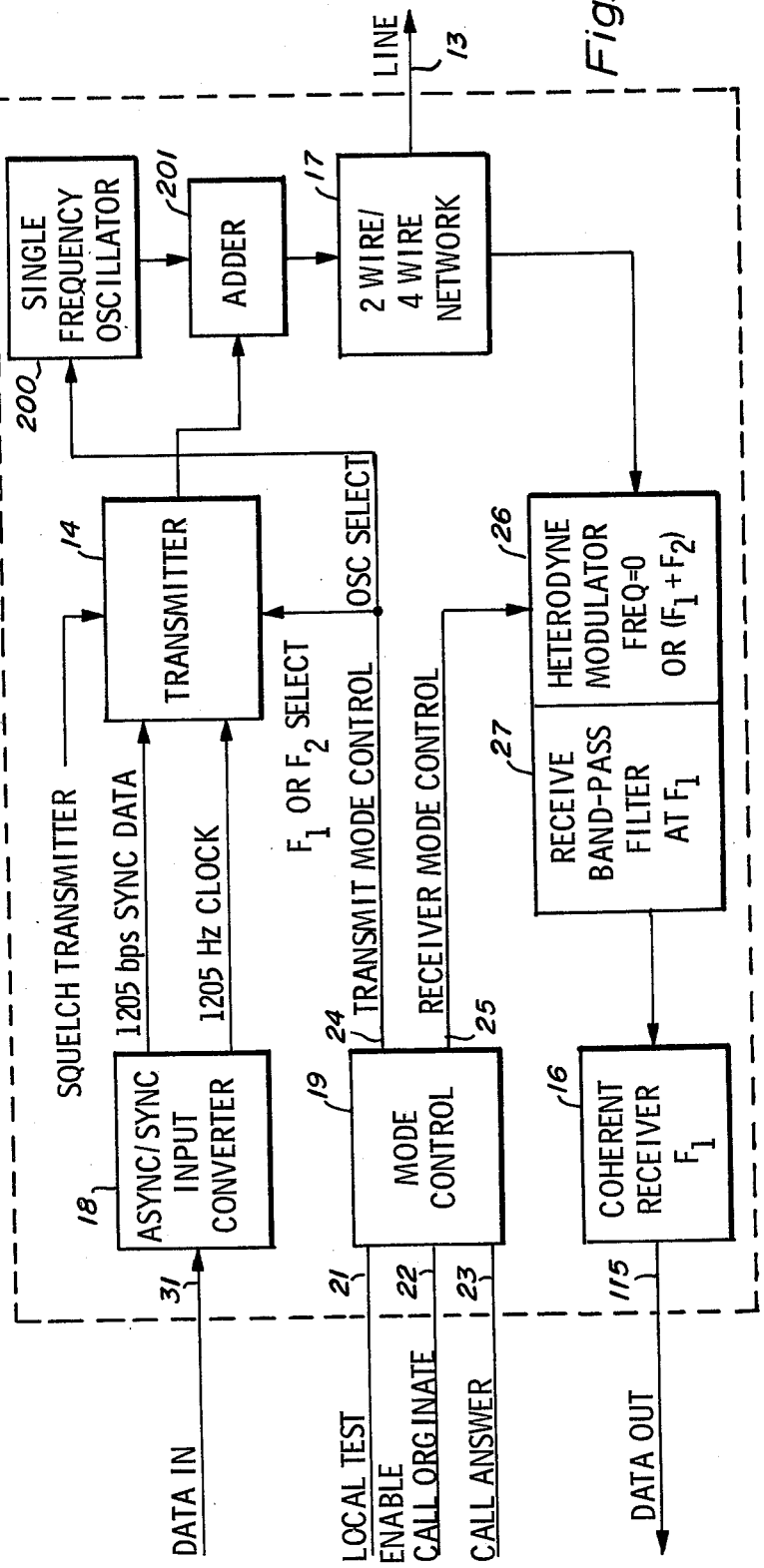
FIG. 2 is a schematic block diagram of one of the full duplex modems shown in FIG. 1.

Referring now to FIG. 2, there is shown a more detailed block diagram of one of the modem 11 shown in FIG. 1. The modem 11 includes an asynchronous to synchronous input buffer or converter 18. The converter 18 receives input data in a character format of 8, 9, 10 or 11 bits in a synchronous form and converts the input data into a bit stream of synchronous data for transmission by transmitter 14. The output of the transmitter enters an adder 201. The other input of the adder 201 is from a single frequency oscillator 200 such that the output of the adder 201 is of the modulated carrier from the transmitter 14 and the single-frequency tone from the oscillator 200. The output of the adder 14 is delivered to the two wire/four wire network 17 where it is transmitted out over the telephone line 13.

The output of the asynchronous to synchronous converter 18 consists of a bit stream of synchronous data at a bit rate of 1205 bits per second and a 1205 Hz clock signal which are inputted to the transmitter 14. The carrier frequency of the transmitter 14 is selected to be either at the high band or the low band depending upon whether the modem is in the call originate mode or the answer mode. This selection is done by the mode control 19, the output 24 of which selects F1 or F2. The mode control is energized by the call originate line 22 or the call answer line 23 being energized to select the mode.

In the call originate mode, the mode control 19 sends an output to the transmitter 14 to cause the transmitted carrier frequency to be in the high-band F2. Similarly, a mode control output 25 is fed to the heterodyne modulator 26. The receiver mode control output selects either a local frequency of 0 frequency or a frequency corresponding to the sum of F1 plus F2 so that the difference frequency at the output of the modulator 26 is always centered at F1 depending upon whether the receiver is to receive on the low or the high-band. That is, when the transmitter is transmitting on the high-band carrier frequency F2, receiver 16 will be receiving on the low-band frequency F1. This is because the modem at the opposite end will be transmitting at the frequency F1 because it will be in the answer mode. The receiver mode control 25 is therefore set to select a 0 frequency reference signal for the modulator 26 which allows the band pass filter 27 to filter the received frequency F1. When the modem is in the answer mode, the receive frequency will be in the high-band or at frequency F2 and therefore the modulator 26 is set to F1 plus F2 so that the resulting frequency passed to the band pass filter 27 will be centered at F1. This way only one receiver 16 is necessary for receiving either in the high-band or in the low-band.

Since the interference problem with single-frequency signaling systems arises only when the transmitter is operating in the high band, the single-frequency oscillator 200 shown in FIG. 2 need only be introduced into the circuit when the transmitter is transmitting at a carrier frequency of F2. The carrier frequency is controlled by the mode control circuit 19 which energizes the transmit mode control line 24 to select either F1 or F2. The transmit mode control line 24 is also fed to oscillator 200 to energize the single-frequency oscillator 200 whenever the frequency F2 has been selected.

Figure 3:
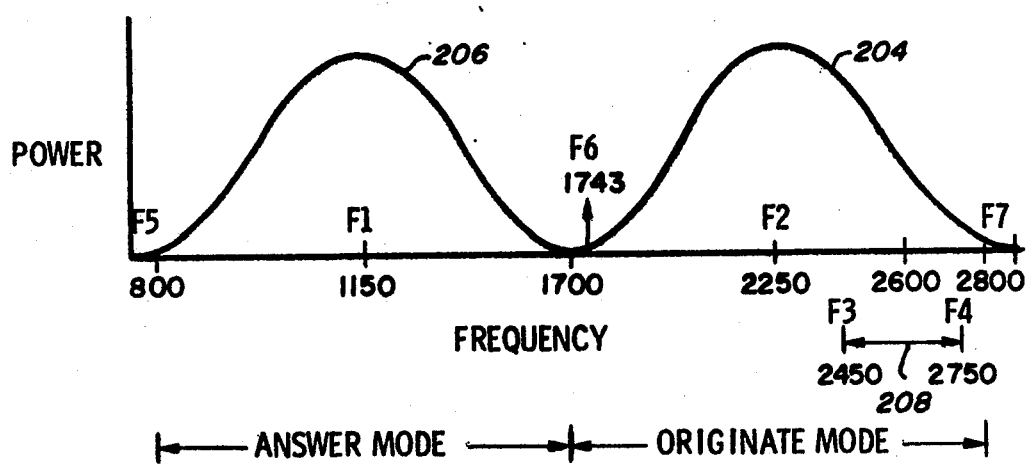
FIG. 3 is a power distribution curve over the frequency band of a typical telephone line.

Referring now to FIG. 3, the transmit power spectra of the modem for the two possible modes is shown. Of course, the transmitter only operates in one mode at a time, transmitting in the high-band 204 centered around F2 (2250 Hz) when the originate mode and in the low-band 206 centered around F1 (1150 Hz) when in the answer mode. The so-called forbidden in-band centers around a single-frequency tone of 2600 Hz and extends from F3 to F4 (2450 to 2750 Hz).

When transmitting random data in either mode, the energy is spread out under the total power envelope and when it arrives at the central switching system, random signals will not trigger the single-frequency signaling system. However, there are certain data patterns that could trigger the single-frequency signaling system if the patterns are repeated when transmitting in the high-band. For example, the pattern 1110 generates a set of discrete tones such that the sum of the in-band tones exceeds that of the out-of-band tones. When repeated, this character could cause triggering of the single-frequency signaling system. By inserting a tone of 1700 Hz, or slightly greater, the effect of the unwanted tones will be compensated for. The generation of the 1700 Hz tone has no effect on the modems' receivers in the embodiment described above because the receive band pass filter 27 is centered at frequency F1 and will filter out the injected tone.

In practice, the transmit and receive filters are not ideal. If they were, the best value for the injected frequency would be exactly 1700 because neither modem can respond to a tone at that point. However, the signal as received by the modem at the other end of the telephone line is attenuated and is therefore at a much lower level in comparison to the high level of the injected tone.

The amplitude of the injected tone F6 to ensure that the energy out-of-band 208 is always greater than the energy within the forbidden bands depends on the particular type of modem and the characters that are to be transmitted. Generally speaking, the "worst" data, i.e., the data that produces the most energy in the forbidden band relative to the energy out of the forbidden band, is first determined either experimentally or by simulation. In case of experimental determination, all possible data are passed through the modem, one at a time, and the energy vs. frequency distribution is determined by a spectrum analyzer or similar means. In the case of simulation, the transfer function of the modem is determined and simulated data are applied, via computers, to provide an expected frequency-energy distribution.

For the modem illustrated in FIG. 2, which is the VADIC 3400 which is also described in U.S. Pat. No. 3,937,882, and with data comprising ASCII characters, the "worst" ASCII character that has been found to date is "0101110111" which produces 2.9dB more energy in the forbidden band than it produces out of the forbidden band. This ASCII character is "w" and the worse case results from the repeated transmission of this character.

Accordingly, the power in the forbidden band ($P_{ib}$) for the particular modem illustrated in FIG. 2 is 1.95 (2.9dB) times the power out of band ($P_{ob}$). The power of the injected tone ($P_t$) therefore must be such that the total power out-of-band is not less than the power in the forbidden band, that is, $P_t + P_{ob}$ must not be less than $P_{ib}$.

From this it follows that the ratio of the power of the injected tone to the total data power must be at least equal to the ratio of the difference between the in and out of band power to the total data power, namely, $Pt/Pib+Pob \geq Pib-Pob/Pib+Pib$.

Substituting the numbers in the second expression, namely 1.95 for $Pib$ and 1.00 for $Pob$, the ratio $(1.95-1/(1.95+1) = 0.322$ ($-4.9$dB) is obtained for the minimum amplitude of the injected tone. In other words, the power of the injected tone $Pt$ should be 4.9dB below the normal data power and this injected tone is transmitted at a frequency which is very near to the center between the high-band and the low-band transmission spectra.

It should be understood that the frequency of the injected tone should not be chosen too far away from the center frequency because this starts to encroach upon the filter in the modem at the far end of the telephone line which is in the answer mode and must separate out the injected tone.

To summarize, full duplex transmission at 1200 bits per second over a voice grade switched telephone line requires synchronous transmission techniques and the use of the band F5 to F7 which brackets 2450 Hz to 2750 Hz. This band is restricted by the telephone company's 2600 Hz single frequency signaling system. The FCC tariff requires equal or greater energy in the band between 800 and 2450 Hz as compared to the band between 2450 and 2750 Hz.

In order to comply with this tariff, an injected tone of 1743 Hz is added to the transmitted information. When the modem transmits in the originate or high mode, the modem injects a tone at 1743 Hz which is 4DB down from the total energy in the 1750 to 2750 Hz band. This satisfies the tariff requirement. The modem also includes adaptive hybrid and band pass and low pass filters to reject the injected tone by a sufficient amount to enable receipt and detection of data signals in the adjacent channel centered around the frequency of 1150 Hz.

The invention has been described with respect to a particular embodiment, with actual frequencies specified. It should be understood that these frequencies are given as examples only and that the principles of the invention can be applied to modems operating at frequencies different from those specified which can be designed in accordance with the invention to meet other tariff restrictions. For example, some modems transmit in the high-band when in the call originate mode, and in the low-band when in the answer mode. The principles of the invention can be easily applied to these modems.

Furthermore, the in-band frequencies may be different in different countries. For example, the in-band range may be below F2.

While the injected tone has been described as being between the two frequencies F1 and F2, it should be understood that there may be applications of the present invention wherein the injected tone is either above F2 or below F1.

While the invention has been particularly shown and described with reference to a preferred embodiment thereof, it will be understood by those skilled in the art that various changes in form and details may be made therein without departing from the spirit and scope of the invention.

What is claimed is:

1. In a duplex data transmission modem having a first mode of operation in which outgoing data is transmitted by modulating a carrier frequency F1 and incoming data is received by a demodulation of a data modulated carrier frequency F2 which is greater than said frequency F1 and a second mode of operation in which data is received by demodulation of said carrier frequency F1 and is transmitted by modulation of said carrier frequency F2, a method of insuring that the power transmitted in a first band of frequencies extending from a frequency F3 to a frequency F4 does not exceed the power transmitted outside said first band of frequencies by a prescribed ratio in order to prevent interference with single frequency signaling systems operating at a frequency within said first band from F3 to F4, comprising the steps of:

operating said modem modulator in said second mode of operation; and injecting a single-frequency tone F6 in the outgoing data transmission path, the power level of said injected tone being such that sufficient power is added to the band outside said first band so that the power in said first band does not exceed the power outside of said first band by said prescribed ratio for any transmittable data pattern.

2. The method of claim 1 wherein said frequency F6 is between said carrier frequencies F1 and F2.

3. The method in accordance with claim 2 wherein said frequency F6 is above the midpoint frequency between F1 and F2 to thereby compensate for the differences in attenuation of received and transmitted signals when said modem is in said second mode of operation.

4. The method in accordance with claim 2 wherein said frequency F1 is 1150 Hz, said frequency F2 is 2250 Hz, said frequency F3 is 2450 Hz, and said frequency F4 is 2750 Hz.

5. The method in accordance with claim 3 wherein said frequency F6 is 1743 Hz.

* * * * *